Aug. 24, 1937.  M. ZIRMER ET AL  2,090,659
BUMPER
Filed March 10, 1937  2 Sheets-Sheet 1

INVENTORS
THOMAS C. BLACK
BY MARTIN ZIRMER
Samuel S. Jacobson
ATTORNEY

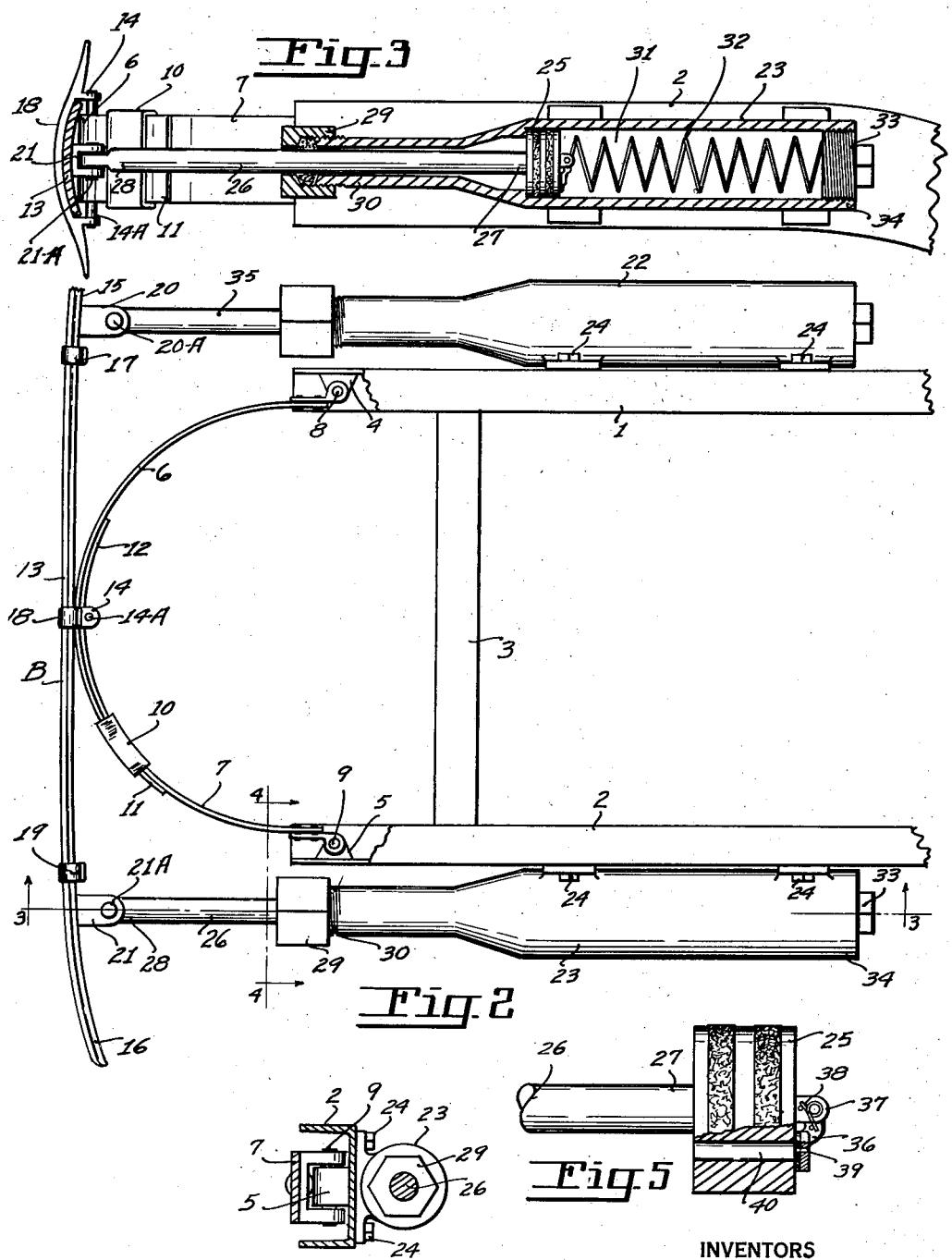

Patented Aug. 24, 1937

2,090,659

UNITED STATES PATENT OFFICE 2,090,659

BUMPER

Martin Zirmer and Thomas C. Black,
Portland, Oreg.

Application March 10, 1937, Serial No. 130,075

3 Claims. (Cl. 293—55)

This invention relates in general to motor vehicle-protecting devices commonly termed bumpers. The utility of bumpers for the protection of the front and rear ends of motor vehicles cannot be questioned since some type of bumper is almost universally used on automobiles and trucks.

The speed of motor vehicles has increased appreciably and, in order to offset the possible consequences of high speeds, manufacturers of motor vehicles have incorporated a number of safety appliances, such as four-wheel brakes, safety glass, etc. No appreciable change, except in design and ornamentation, has been made on the well-known bumper, now standard equipment on practically all motor vehicles. Experience has indicated that the only reliance placed upon the present type of bumper is to avoid casual impacts created in parking motor vehicles in congested areas. No attempt has heretofore been made to provide a bumper which possesses the quality of receiving substantial blows without being damaged and of providing means for cushioning and dissipating the force of the blow before it has the opportunity to jar or vibrate the chassis of the motor vehicle to which the bumper is attached.

It is within the contemplation of our invention to overcome this and other disadvantages inherent in the present type of bumper. This is accomplished by providing a bumper which is indirectly secured to the chassis of a car by the use of a pair of reciprocally mounted pistons and springs, slidably mounted with respect to each other and the bumper. By this arrangement, any blow received by the bumper cannot directly be absorbed by the chassis but is cushioned, absorbed, and dissipated through the action of the reciprocating pistons and springs.

As a correlary to the previous object, the invention provides a bumper which is capable of cushioning, absorbing, and dissipating either a direct or glancing blow, the cushioning, absorption, and dissipation of the blow being directly proportional to the shock received by the bumper.

The quintessence of our invention is to provide a bumper, adapted for use on the front and rear portions of automobiles, trucks, and other vehicles where such protective devices are desirable, which possesses characteristics permitting the cushioning, absorption, and practically complete dissipation of any shocks created by unexpected impacts with other objects while said objects are in motion or otherwise.

Still another object is to provide a bumper simple of design, attractive in appearance, durable and practical of construction, inexpensive to manufacture, and assembled with a view to permitting replacements of parts with ease.

Other objects of the invention and features possessing novelty will become apparent as the following detailed description is read. In the accompanying drawings forming a part of the specification herein there is shown the preferred embodiment of our invention and two modified forms of parts of our invention for the purpose of illustration, and in which like reference characters are employed to designate corresponding parts throughout the several views:

Figure 2 is a top view of a bumper embodying the principles of our invention and detailing the manner of attachment of the bumper and its co-operating elements to the frame of a motor vehicle, parts of which are broken away.

Figure 3 is a sectional, side-view, taken on line 3—3 of Figure 2, looking in the direction indicated, showing the details of one of the cylinders embodying the principles of our invention.

Figure 4 is a sectional, end-view, taken on line 4—4 of Figure 2, looking in the direction indicated.

Figure 5 is an enlarged side-view, partially in section, of the piston exposed in Figure 3, graphically showing the details of construction.

Figure 1:
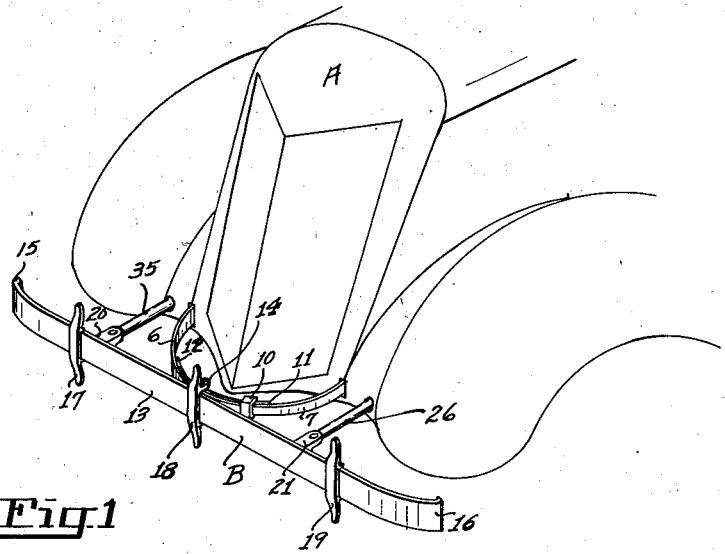
Figure 1 is a perspective, front view of a bumper embodying the principles of our invention as it appears when applied to the front end of an automobile fancifully represented.

The applicability of a bumper embodying the principles of our invention to a motor vehicle is broadly illustrated in Figure 1 wherein reference character A designates an automobile which, for the purpose of the following description, should be considered as representative of any vehicle to which a bumper embodying the principles of our invention may be applied either at the front or rear portion thereof. Reference character B designates in general a bumper embodying the principles of our invention as it appears when attached to the front end of automobile A. No degree of imagination is required to appreciate the fact that a bumper embodying the same principles and appearance may be secured to the rear portion of the automobile with equal facility and advantage.

Bumper B is composed of a number of elements, which, while mostly disclosed in Figure 1, is best illustrated in Figure 2 in which reference numerals 1 and 2 designate the side members of the frame of automobile A with tie member 3 disposed transversely between and secured to members 1 and 2. Brackets 4 and 5 are secured to front portions of members 1 and 2, respectively, in any desirable manner or fabricated as an integral part thereof. Similar or identical brackets may be positioned at the rear portions of members 1 and 2.

In order to prevent repetition of description, assumption is here made that the front and rear portion of the automobile A passes the same structural characteristics so that, in describing the structure disclosed in Figure 2, it is to be assumed that similar or identical structure may be found at the rear end of the automobile.

Arcuately shaped resilient members 6 and 7 are hingedly secured to brackets 4 and 5 respectively as shown at 8 and 9. Sleeve 10 is secured to resilient member 7 and permits the end portion 11 of resilient member 6 to freely move therein, while the end portion 12 of resilient member 7, because of the inherent resiliency of the resilient members, rides in intimate, slidable contact with the resilient member 6. Resilient members 6 and 7 are engaged in slidable relation with each other to bumper-member 13 by the use of U-bracket 14 which, in turn, is fixedly secured to bumper-bar 13, equi-distant from the ends 15 and 16 of said bumper-bar. The resilient members are held in working relation within U-bracket 14 by pin 14A. It might well be pointed out that bumper-bar 13 is disposed transversely with relation to the frame of the automobile A, as illustrated in Figures 1 and 2, and has secured, at equally spaced intervals, vertically disposed guards 17, 18 and 19 which not only provide a modicum of decoration but also perform the utilitarian functions of a scope sufficiently well known as to make description thereof unnecessary.

Additional U-brackets 20 and 21 are secured to or made integral with and extend inwardly from bumper-bar 13. These brackets are equally spaced from the center U-bracket 14. The purpose of these U-brackets will become apparent after a more detailed description is presented of the structural characteristics possessed by and incorporated within the cylinders 22 and 23.

Cylinder 22 is removably secured to the side member 1 and cylinder 23 is removably secured to side member 2 by the use of threaded bolts 24 or by any other desirable means. The preferred type of shock-absorbing member is graphically illustrated in cross section in Figure 3, wherein cylinder 23 has a properly washered piston 25 adapted for slidable engagement with the interior wall thereof. Piston rod 26 has its end 27 secured to the piston 25 and its other end 28 linked to U-bracket 21 and held therein by pin 21A. The usual type of packing gland 29 is threadably secured to the end 30 of cylinder 23 and is disposed around the piston rod 26 so that any liquid confined within the interior 31 of cylinder 23 cannot escape therefrom. A resilient member 32 is compressively disposed within the interior 31 with one of its ends placed against the piston 25 and the other of its ends against plug 33 which is threadably secured to the end 34 of cylinder 23.

Cylinder 22 possesses the same structural characteristics, but its piston rod 35 is linked to U-bracket 20 and held therein by pin 20A. Each of these cylinders 22 and 23 contains a liquid substance, preferably oil, which offers resistance to the reciprocation of the piston 25 within the interior 31 of each of the cylinders.

In Figure 5 may be graphically seen an enlarged portion of piston 25 which is partially broken away and in which is shown check valve 36 which is hingedly secured to bracket 37 extending from piston 25. The check valve is normally held under spring tension against the face of the piston 25 by resilient member 38. A port 39 passes through the check valve 36 and communicates with a port 40 extending through the piston 25. Port 40 is much larger in area than port 39 in order that the liquid may flow with greater speed and less resistance through port 40 than it can through port 39. The piston disposed in cylinder 22 possesses the same structure and functions, of course, in the same manner.

Figure 6:
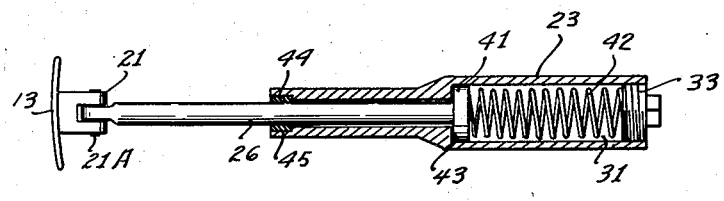
Figure 6 is a sectional, side-view of a cylinder possessing slightly modified construction which may be used in lieu of the type shown in Figure 3.

In Figure 6 is shown a cylinder 23, the construction of which is similar to cylinders 22 and 23 heretofore described, but which contains a somewhat different type of piston. Piston 41 is attached to piston rod 26 which, in turn, is attached to U-bracket 21. A compressed spring 42, which has one end disposed against the face of piston 41 and the other against plug 33, normally holds the piston 41 against interior wall 43 of cylinder 23. A flexible material 44 is confined within the recess 45 formed at the extreme end of cylinder 23 and surrounds piston rod 26. By this arrangement rattling noises are prevented without interfering with the reciprocation of piston rod 26.

Figure 7:
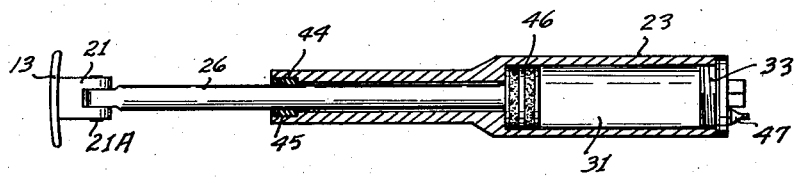
Figure 7 is also a sectional, side-view of a cylinder having still other slightly modified construction which may be used in lieu of the type shown in Figures 3 and 6.

Figure 7 also shows a cylinder 23 possessing substantialy the same structure as that possessed by cylinders 22 and 23 heretofore described, but which contains still another type of piston. Properly washered piston 46 is adapted for reciprocation within the interior 31 and is joined to piston rod 26 which, in turn, is linked to U-bracket 21. An air valve 47 communicates with the interior 31 into which air under pressure may be forced. Air valve 47 may be connected to the air-braking system of the vehicle with which the bumper embodying the principles of our invention is used, or it may be operated independently of such a system.

This completes the description of the preferred embodiment of our invention and of the modified types of cylinder assemblies embodying the principles of our invention. It is well at this time to relate the manner in which the invention operates. When the bumper-bar 13 strikes an object, the impact simultaneously causes the resilient members 6 and 7 to bend and slide against each other and forces the piston rods 26 and 35 to move rearwardly. If the piston rods 26 and 35 are connected to the type of piston pointed out as the preferred form and illustrated in Figures 3 and 5, the liquid contained in the interior 31 will pass through port 39 and through port 40. If the piston rods referred to are secured to a piston of the type illustrated in Figure 6, spring 42 will be further compressed; and, finally, if the piston rods are secured to a piston of the type illustrated in Figure 7, the piston, in its rearward movement, will further compress the air confined within the interior 31. In any such case the rearward movement of the piston rods and pistons will be cushioned and finally stopped either by the liquid referred to in describing Figures 3 and 5, or by the spring referred to in describing Figure 6, or by the air referred to in describing Figure 7. Immediately after the pressure upon the bumper-bar 13 is removed, the piston rods and the resilient members 6 and 7 will resume their normal position.

It is obvious that the amount and speed of recession by the piston rods and pistons connected thereto, and the amount of bending of the resilient members 6 and 7 will be directly proportional to the blow received by the bumper-bar; and, under normal conditions, before the shock of any impact could reach the chassis of the automobile to which the bumper embodying the principles of our invention is secured, it would be completely cushioned, absorbed, and dissipated. It is also obvious that the point of impact on the bumper-bar determines whether both piston rods recede equally in quantity and in speed or in different proportion and degree. If either end of the bumper-bar 13 were struck separately, the piston rod nearest the impact would be the one that would recede a greater distance and at greater speed than the other piston rod and vice versa.

While in the foregoing description the invention is set forth as particularly adapted for use on the front part of a motor vehicle, it is quite obvious that an identical arrangement may be utilized for the rear end of a motor vehicle. Furthermore, while the invention has been illustrated and described as taking one particular form, it is to be understood that the invention is not so limited, but is susceptible of various changes and modifications, not only in design, but also in structure, without departing from the spirit of the invention. Hence we do not limit ourselves to the precise construction set forth; and we desire, therefore, that only such limitations shall be placed thereupon as are imposed by and specifically set forth in the appended claims.

Having thus described our invention, what we claim as new and desire to secure by Letters Patent is:

1. In a device of the class described, in combination with the frame of a motor vehicle, a pair of cylinders secured to the sides of said frame, a piston reciprocably disposed within each of said cylinders, a piston rod secured to each piston and extending from each of said cylinders, a pair of arcuately shaped resilient members hingedly secured to the sides of said frame and positioned with respect to each other to permit their slidable engagement, and a bumper-bar secured to the ends of each piston rod and disposed with relation to the resilient members to provide for them a slot through which they may slide freely.

2. In a device of the class described, in combination with the frame of a motor vehicle, a pair of pistons adapted for reciprocation under the cushioning effect of a fluid, a bumper-bar, means for joining the bumper-bar to said pistons, and resilient members slidably joined to said bumper-bar and hingedly secured to the frame of the motor vehicle.

3. In a device of the class described, in combination with the frame of a motor vehicle, a pair of cylinders having a fluid confined therein, a piston reciprocably disposed within each of said cylinders and adapted to act upon the fluid there contained, a bumper-bar, means for joining said bumper-bar to each of said pistons whereby the shock received by the bumper-bar by its impact with any object is cushioned, absorbed, and dissipated, and resilient members normally compressed against said bumper-bar and adapted for slidable engagement therewith and hingedly secured to the frame of said motor vehicle.

MARTIN ZIRMER.
THOMAS C. BLACK.